US009994649B2

(12) United States Patent
Zenke et al.

(10) Patent No.: US 9,994,649 B2
(45) Date of Patent: Jun. 12, 2018

(54) HYDROFLUOROCARBON RECOVERY METHOD

(71) Applicant: DAIKIN INDUSTRIES, LTD., Osaka-shi, Osaka (JP)

(72) Inventors: Yumi Zenke, Osaka (JP); Tadaharu Isaka, Osaka (JP); Ryouichi Fukagawa, Osaka (JP); Takeshi Shimono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/319,134

(22) PCT Filed: Jun. 2, 2015

(86) PCT No.: PCT/JP2015/065935
§ 371 (c)(1),
(2) Date: Dec. 15, 2016

(87) PCT Pub. No.: WO2015/194367
PCT Pub. Date: Dec. 23, 2015

(65) Prior Publication Data

US 2017/0137543 A1 May 18, 2017

(30) Foreign Application Priority Data

Jun. 17, 2014 (JP) ................................ 2014-124626

(51) Int. Cl.
*C08F 6/10* (2006.01)

(52) U.S. Cl.
CPC .................................... *C08F 6/10* (2013.01)

(58) Field of Classification Search
USPC .............................................. 526/71; 568/32
See application file for complete search history.

(56) References Cited

U.S. PATENT DOCUMENTS

2007/0117939 A1 5/2007 Iaccino et al.
2010/0048956 A1* 2/2010 Isaka ...................... C08F 6/003 568/32

(Continued)

FOREIGN PATENT DOCUMENTS

CN 103534283 A 1/2014
CN 103619890 A 3/2014

(Continued)

OTHER PUBLICATIONS

International Search Report for PCT/JP2015/065935 dated Jul. 28, 2015 [PCT/ISA/210].

(Continued)

*Primary Examiner* — Mark Kaucher
*Assistant Examiner* — Henry Hu
(74) *Attorney, Agent, or Firm* — Sughrue Mion, PLLC

(57) ABSTRACT

A method for recovering a hydrofluorocarbon, including: producing a wet fluoropolymer by suspension polymerization, solution polymerization, or bulk polymerization in the presence of a hydrofluorocarbon; vaporizing and discharging vaporizable substances including the hydrofluorocarbon by heating the wet fluoropolymer in a container; and transferring the discharged vaporizable substances to a cooling means to cool the substances.

12 Claims, 1 Drawing Sheet

23
24
11
22
21
12

(56) References Cited

U.S. PATENT DOCUMENTS

| | | | | |
|---|---|---|---|---|
| 2010/0087605 | A1 | 4/2010 | Yamamoto et al. | |
| 2014/0080930 | A1* | 3/2014 | Fukunaga | C08F 6/00 521/27 |
| 2014/0100344 | A1* | 4/2014 | Aida | C08F 214/18 526/243 |
| 2015/0376100 | A1 | 12/2015 | Zenke et al. | |

FOREIGN PATENT DOCUMENTS

| | | | |
|---|---|---|---|
| JP | 6-298810 | A | 10/1994 |
| JP | 7-504224 | A | 5/1995 |
| JP | 2001-261714 | A | 9/2001 |
| JP | 2006-219549 | A | 8/2006 |
| JP | 2008-106248 | A | 5/2008 |
| JP | 2010-501673 | A | 1/2010 |
| JP | 2012-241128 | A | 12/2012 |
| JP | 2013-199518 | A | 10/2013 |
| WO | 93/17053 | A1 | 9/1993 |
| WO | 2008/024602 | A1 | 2/2008 |
| WO | 2012/157715 | A1 | 11/2012 |
| WO | WO-2012/157715 | A1 * | 11/2012 |
| WO | 2012/173153 | A1 | 12/2012 |
| WO | WO-2012/173153 | A1 * | 12/2012 |
| WO | 2014/112592 | A1 | 7/2014 |
| WO | 2014/115679 | A1 | 7/2014 |

OTHER PUBLICATIONS

International Preliminary Report on Patentability, dated Dec. 20, 2016, from the International Bureau in counterpart International application No. PCT/JP2015/065935.

Communication dated Nov. 2, 2017 from the European Patent Office in counterpart European application No. 15810274.9.

* cited by examiner

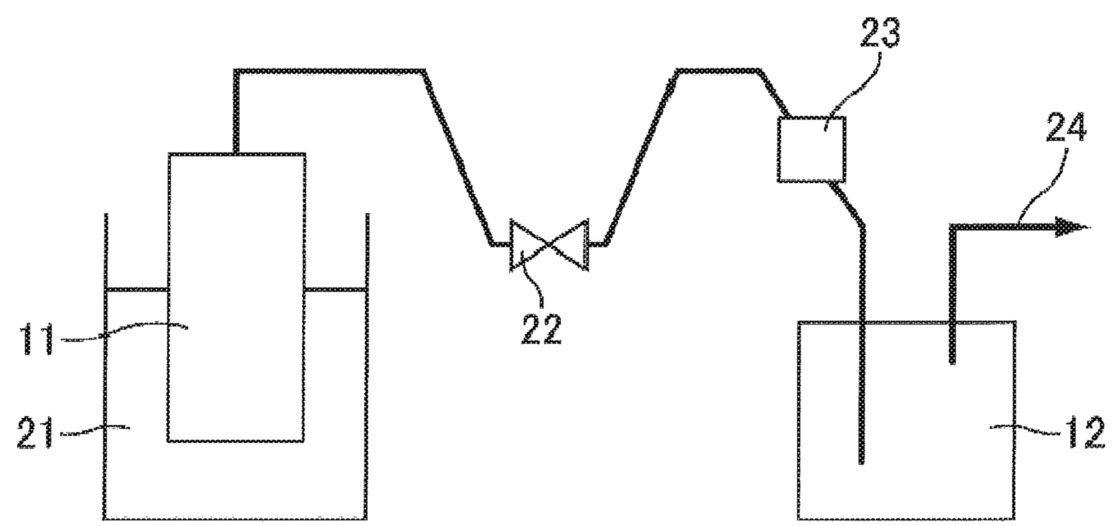
23
24
11
22
21
12

HYDROFLUOROCARBON RECOVERY METHOD

CROSS REFERENCE TO RELATED APPLICATIONS

This is a National Stage of International Application No. PCT/JP2015/065935 filed Jun. 2, 2015, claiming priority based on Japanese Patent Application No. 2014-124626 filed Jun. 17, 2014, the contents of all of which are incorporated herein by reference in their entirety.

TECHNICAL FIELD

The present invention relates to methods for recovering hydrofluorocarbons. More specifically, the present invention relates to a method for recovering a hydrofluorocarbon used for producing fluoropolymers.

BACKGROUND ART

Emulsion polymerization and suspension polymerization are known as methods for producing fluoropolymers. In these polymerization methods, perfluorocarbon (PFC) or chlorofluorocarbon (CFC) has been used as a polymerization medium. PFC and CFC however have a high global warming potential (GWP), and CFC also has a high ozone depletion potential. Therefore, it is preferred to reduce the amounts of these to be used. Further, since PFC and CFC are likely to adsorb on fluoropolymers, they are released and vaporized to form bubbles when the fluoropolymers are extruded, causing molding failures. Therefore, solvents alternative to PFC and CFC have been suggested.

Patent Literature 1 suggests a polymerization method that includes bringing a fluoromonomer into contact with a solvent that contains carbon; fluorine; at least one hydrogen atom; at least as many fluorine atoms as hydrogen atoms; no more than two adjacent —$CH_2$— groups; no hydrogen atoms on any primary carbon; and no methyl (—$CH_3$) groups, except as the grouping —$CF_2OCH_3$.

Patent Literature 2 suggests a method for producing an ethylene-tetrafluoroethylene copolymer which is polymerized using a polymerization initiator in a polymerization medium in the presence of a chain transfer agent. In the method, the polymerization medium is a saturated C3-C10 hydrofluorocarbon containing one or more fluorine atoms and hydrogen atom(s) in a number equal to or smaller than fluorine atoms, and the chain transfer agent is a saturated C3-C10 hydrocarbon or hydrofluorocarbon (excluding a saturated hydrofluorocarbons containing one or more fluorine atoms and hydrogen atom(s) in a number equal to or smaller than fluorine atoms).

Further, in the above described production methods of fluoropolymers using polymerization mediums, it is preferred that the polymerization medium is separated, recovered, and recycled after the polymerization reaction in view of economic and environmental benefits. Thus, a polymerization medium recovery method is known.

Patent Literature 3 discloses a production method of a fluorocopolymer including copolymerizing tetrafluoroethylene with a specific fluorine-containing vinyl ether using perfluoroheptane as a reaction solvent in the presence of a chain transfer agent in an amount of 0.5 to 4 mol % relative to the total amount of the added monomers, and discloses recovery of the reaction solvent after the polymerization reaction in the method.

Patent Literature 4 discloses a method for producing fluoropolymers, comprising polymerizing at least one fluorinated monomer to yield a fluoropolymer in a polymerization medium including water and a specified low-telogenic hydrofluoroether (HFE), and the method further comprises separating the fluoropolymer and water from the HFE solvent by distillation of the HFE solvent while the fluoropolymer is agglomerated, and reusing the HFE solvent for another process.

CITATION LIST

Patent Literature

Patent Literature 1: JP H07-504224 T
Patent Literature 2: JP H06-298810 A
Patent Literature 3: JP 2001-261714 A
Patent Literature 4: JP 2010-501673 T

SUMMARY OF INVENTION

Technical Problem

As described above, it is known that solvents used for producing fluoropolymers are recovered. However, in the case of using perhalogenated carbons such as perfluoroheptane as a solvent as described in Patent Literature 3, perhalogenated carbons, which are difficult to separate from fluoropolymers, are likely to remain in the fluoropolymers and are difficult to recover even if they are vaporized by heating. Thus, recovery of perhalogenated carbons takes a long time, and the recovery efficiency is low. Further, perhalogenated carbons, which are likely to volatilize, are poorly recovered through condensation by cooling.

Meanwhile, fluorine-containing ethers can be recovered with higher recovery efficiency through condensation by cooling as compared to perhalogenated carbons. However, the method in Patent Literature 4 needs to be further improved in order to reduce the recovery time and sufficiently raise the recovery efficiency.

The present invention has been made in view of the current state of the art described above, and aims to provide a method for recovering a hydrofluorocarbon capable of recovering a hydrofluorocarbon used for producing fluoropolymers with higher recovery efficiency and in a shorter time.

Solution to Problem

The present inventors have performed various examinations on the process capable of recovering a hydrofluorocarbon used for producing fluoropolymers with higher recovery efficiency and in a shorter time. As a result, they have found that a hydrofluorocarbon can be easily separated from a fluoropolymer and can be recovered without waste in the following way: a wet fluoropolymer produced is heated in a container containing a hydrofluorocarbon to vaporize and discharge vaporizable substances including the hydrofluorocarbon, and the vaporizable substances in the vaporized state are transferred to a cooling means and are cooled. In this way, the hydrofluorocarbon can be recovered with higher recovery efficiency and in a shorter time as a result of producing a wet fluoropolymer using a hydrofluorocarbon as a polymerization solvent by suspension polymerization, solution polymerization, or bulk polymerization in the presence of the hydrofluorocarbon; vaporizing and discharging vaporizable substances including the hydrofluorocarbon by heating the wet fluoropolymer in a container; and transferring the vaporizable substances in the vaporized state to a cooling means to cool the substances. Thus, the present inventors admirably solved the above problems, and the present invention has been completed.

That is, the present invention relates to a method for recovering a hydrofluorocarbon, including:

producing a wet fluoropolymer by suspension polymerization, solution polymerization, or bulk polymerization in the presence of a hydrofluorocarbon;

vaporizing and discharging vaporizable substances including the hydrofluorocarbon by heating the wet fluoropolymer in a container; and transferring the discharged vaporizable substances to a cooling means to cool the substances.

The hydrofluorocarbon preferably has a boiling point of −10° C. to 100° C.

The hydrofluorocarbon preferably has a boiling point of 0° C. to 85° C.

In the vaporizing step, the temperature in the container is preferably 0° C. to 100° C.

The fluoropolymer preferably has a polymerized unit derived from at least one fluoromonomer selected from the group consisting of tetrafluoroethylene, hexafluoropropylene, vinylidene fluoride, chlorotrifluoroethylene, (perfluoromethyl)vinyl ether, (perfluoroethyl)vinyl ether, (perfluoropropyl)vinyl ether, trifluoroethylene, vinyl fluoride, perfluoro(alkyl vinyl ethers) represented by the formula (2-1):

$$CF_2{=}CFO(CF_2CF(Y)O)_m(CF_2)_nF \quad (2\text{-}1)$$

wherein Y represents a fluorine atom or a trifluoromethyl group, m is an integer of 0 to 2, and n is an integer of 1 to 4, monomers represented by the formula (2-2):

$$CH_2{=}CF(CF_2)_nZ \quad (2\text{-}2)$$

wherein Z represents a fluorine atom or a hydrogen atom, and n is an integer of 1 to 8, and monomers represented by the formula (2-3):

$$CH_2{=}CH(CF_2)_nZ \quad (2\text{-}3)$$

wherein Z represents a fluorine atom or a hydrogen atom, and n is an integer of 1 to 8.

The fluoropolymer preferably has a polymerized unit derived from tetrafluoroethylene and a polymerized unit derived from ethylene.

The recovering method of the present invention preferably further includes transferring the vaporizable substances liquefied by cooling in the cooling step to a distillation means to distill the substances.

In the recovering method of the present invention, x/V is preferably at most 0.140,
wherein V represents an inner volume (L) of the container, and x represents a discharge rate (kg/hour) of the vaporizable substances discharged from the container.

A fluorine-containing compound having a lower boiling point than the hydrofluorocarbon is preferably added to the wet fluoropolymer.

The recovering method of the present invention preferably further includes transferring the vaporizable substances vaporized in the vaporizing step to a compression means to compress the substances.

The compression means is preferably a compressor.

The cooling means is preferably a condenser.

The present invention also relates to a method for using a hydrofluorocarbon including:

reusing a hydrofluorocarbon recovered by the method for recovering a hydrofluorocarbon.

Advantageous Effects of Invention

The recovering method of the present invention has the above configuration. Therefore, a hydrofluorocarbon used for producing a fluoropolymer can be recovered with higher recovery efficiency and in a shorter time.

BRIEF DESCRIPTION OF DRAWINGS

FIG. 1 is a flow diagram illustrating an example of the overall process of the recovering method of the present invention.

DESCRIPTION OF EMBODIMENTS

The recovering method of the present invention includes producing a wet fluoropolymer by suspension polymerization, solution polymerization, or bulk polymerization in the presence of a hydrofluorocarbon. The wet fluoropolymer includes a hydrofluorocarbon and a fluoropolymer. The wet fluoropolymer produced by suspension polymerization includes the hydrofluorocarbon, water, and a fluoropolymer.

The hydrofluorocarbon is preferably nonflammable.

The hydrofluorocarbon preferably has 3 to 10 carbons. A hydrofluorocarbon having less than 3 carbons has a low boiling point, and therefore the temperature of the cooling step needs to be low. As a result, the equipment cost for a cooling means such as condensers increases, which may make the process costly. A hydrofluorocarbon having more than 10 carbons has a high boiling point, and therefore the temperature in a container in the vaporizing step needs to be high. As a result, the equipment cost increases, which may make the process costly. Further, at high vaporizing temperature, the fluoropolymer may be stained. The hydrofluorocarbon has more preferably not more than 7 carbons, still more preferably not more than 5 carbons.

The hydrofluorocarbon is represented by the following compositional formula:

$$C_XF_YH_{(2X+2-Y)}$$

wherein X represents an integer of 1 or more, Y represents an integer of not less than 1 and not more than (2X+2−1).

In the hydrofluorocarbon, X preferably represents 3 to 10, more preferably 3 to 7, still more preferably 3 to 5, and Y preferably represents 1 to 10, more preferably 1 to 7, still more preferably 2 to 5.

The hydrofluorocarbon has a global warming potential (GWP) of preferably not more than 5000, more preferably not more than 2000, still more preferably not more than 1000.

Hydrofluorocarbons not recovered and emitted to the atmosphere, which may be a cause of promoting global warming, are better to have a low GWP.

The hydrofluorocarbon preferably has a boiling point of −10° C. to 100° C. The hydrofluorocarbon having a boiling point falling within the above range is easily separated from solvents such as water when vaporizable substances are recovered through vaporization after polymerization. If the boiling point is higher than 100° C., the temperature in the container in the vaporizing step needs to be high. Therefore, the equipment cost increases, which makes the process costly. Further, the increased temperature in the vaporizing step may cause staining of the fluoropolymer. Furthermore, if the boiling point is higher than 100° C., water vaporizes along with the hydrofluorocarbon in the vaporizing step, which may cause difficulty in separation of the hydrofluorocarbon from water. If the boiling point is lower than −10° C., the temperature in the cooling step needs to be low. Therefore, the equipment cost for a cooling means such as condensers increases, which makes the process costly.

In order to easily separate the hydrofluorocarbon from water, the boiling point is more preferably not lower than 0° C., still more preferably not lower than 5° C. The boiling point is more preferably not higher than 85° C., still more preferably not higher than 70° C., particularly preferably not higher than 60° C.

The hydrofluorocarbon is specifically preferably at least one selected from the group consisting of HFC-236fa, HFC-245fa, HFC-365mfc, and HFC-43-10mee, more preferably at least one selected from the group consisting of HFC-245fa, HFC-365mfc, and HFC-43-10mee.

The hydrofluorocarbon is usable as a polymerization solvent. The hydrofluorocarbon does not have anesthetic properties hydrofluoroethers have, and is therefore highly safe. Further, the hydrofluorocarbon does not destruct the ozone layer unlike hydrochlorofluorocarbons, chlorofluorocarbons, or the like.

The amount of the hydrofluorocarbon is appropriately selected depending on the type and characteristics of a target polymer. The hydrofluorocarbon may be mixed with other polymerization solvents. Further, the hydrofluorocarbon in which a polymerization initiator is preliminary dissolved may be added to a reaction vessel. That is, the hydrofluorocarbon can be used as a solvent for an initiator.

The wet fluoropolymer is produced by suspension polymerization, solution polymerization, or bulk polymerization of a fluoromonomer. Suspension polymerization is preferred as a polymerization method.

The fluoromonomer is preferably at least one fluoromonomer selected from the group consisting of tetrafluoroethylene (TFE), hexafluoropropylene (HFP), vinylidene fluoride (VdF), chlorotrifluoroethylene (CTFE), (perfluoromethyl) vinyl ether, (perfluoroethyl)vinyl ether, (perfluoropropyl) vinyl ether, trifluoroethylene, vinyl fluoride, perfluoro(alkyl vinyl ethers) represented by the formula (2-1):

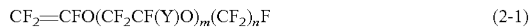

$$CF_2{=}CFO(CF_2CF(Y)O)_m(CF_2)_nF \quad (2\text{-}1)$$

(wherein Y represents a fluorine atom or a trifluoromethyl group, m is an integer of 0 to 2, and n is an integer of 1 to 4), monomers represented by the formula (2-2):

$$CH_2{=}CF(CF_2)_nZ \quad (2\text{-}2)$$

(wherein Z represents a fluorine atom or a hydrogen atom, and n is an integer of 1 to 8), and monomers represented by the formula (2-3):

$$CH_2{=}CH(CF_2)_nZ \quad (2\text{-}3)$$

(wherein Z represents a fluorine atom or a hydrogen atom, and n is an integer of 1 to 8).

In the formula (2-1), m is preferably an integer of 0 or 1, more preferably 0. Further, n is preferably an integer of 1 to 3.

In the formula (2-2), Z is preferably a hydrogen atom. Further, n is preferably an integer of 1 to 6, more preferably an integer of 1 to 4.

In the formula (2-3), Z is preferably a fluorine atom. Further, n is preferably an integer of 1 to 6, more preferably an integer of 1 to 4.

The fluoropolymer is preferably a fluororesin. The fluororesin may be any resin having a clear melting point.

The fluoropolymer has a melting point of preferably 100° C. to 347° C., more preferably 110° C. to 322° C.

The melting point can be determined as a temperature corresponding to the maximum value in the melting heat curve in which the temperature rise rate is 10° C./min using a DSC device (Seiko Instruments Inc.).

The fluoropolymer preferably has a melt flow rate (MFR) of 1 to 100 g/10 min.

The MFR is measured under a load of 5.0 kg in accordance with ASTM D 3307. The temperature for measurement varies depending on the melting point of the fluoropolymer.

The fluoropolymer preferably has a polymerized unit derived from at least one fluoromonomer selected from the group consisting of tetrafluoroethylene [TFE], hexafluoropropylene [HFP], vinylidene fluoride [VdF], chlorotrifluoroethylene [CTFE], (perfluoromethyl)vinyl ether, (perfluoroethyl)vinyl ether, (perfluoropropyl)vinyl ether, trifluoroethylene, vinyl fluoride, perfluoro(alkyl vinyl ethers) represented by the formula (2-1):

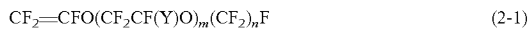

$$CF_2{=}CFO(CF_2CF(Y)O)_m(CF_2)_nF \quad (2\text{-}1)$$

(wherein Y represents a fluorine atom or a trifluoromethyl group, m is an integer of 0 to 2, and n is an integer of 1 to 4), monomers represented by the formula (2-2):

$$CH_2{=}CF(CF_2)_nZ \quad (2\text{-}2)$$

(wherein Z represents a fluorine atom or a hydrogen atom, and n is an integer of 1 to 8), and monomers represented by the formula (2-3):

$$CH_2{=}CH(CF_2)_nZ \quad (2\text{-}3)$$

(wherein Z represents a fluorine atom or a hydrogen atom, and n is an integer of 1 to 8).

The polymerized unit derived from a monomer used herein represents a form in which an unsaturated carbon-carbon double bond in a monomer molecule is replaced by a single bond.

The fluoropolymer may have a polymerized unit derived from a non-fluorinated monomer. In view of keeping the heat resistance, the chemical resistance, and other properties, the fluoropolymer may include a polymerized unit derived from an ethylenic monomer having or less carbon atoms. Such an embodiment is one preferred embodiment. The fluoropolymer preferably also has a polymerized unit derived from at least one non-fluorinated monomer selected from the group consisting of ethylene [Et], propylene, 1-butene, 2-butene, alkyl vinyl ether, vinyl chloride, vinylidene chloride, and unsaturated carboxylic acids.

The fluoropolymer more preferably has a polymerized unit derived from tetrafluoroethylene and a polymerized unit derived from ethylene.

A gas mixture of tetrafluoroethylene and ethylene has an explosive range, and has a risk of explosion in the vaporizing step. The explosive range is reduced in the presence of the hydrofluorocarbon to reduce the risk of explosion. Therefore, safer vaporization can be achieved.

The fluoropolymer is preferably at least one selected from the group consisting of TFE/HFP copolymers [FEP], TFE/perfluoro(alkyl vinyl ether) copolymers [PFA], Et/TFE copolymers [ETFE], TFE/HFP/VdF copolymers [THV], VdF/TFE copolymers [VT], polyvinylidene fluoride [PVdF], polychlorotrifluoroethylene [PCTFE], and CTFE copolymers. The fluoropolymer is more preferably a melt-processable fluoropolymer, still more preferably at least one selected from the group consisting of ETFE, VT, CTFE copolymers, and PFA. Particularly preferred is ETFE.

In the ETFE, the molar ratio of Et unit:TFE unit is preferably 20:80 to 80:20. The molar ratio of Et unit:TFE unit is more preferably 35:65 to 55:45. ETFE is a copolymer including a polymerized unit derived from TFE and a polymerized unit derived from Et, and may include a polymerized unit derived from another fluoromonomer or another non-fluorinated monomer.

Such another fluoromonomer and another non-fluorinated monomer may be any monomers capable of being added to both Et and TFE. A C3-C10 fluorine-containing vinyl monomer is easy to use, and specifically, for example, hexafluoroisobutylene, $CH_2{=}CFC_3F_6H$, or HFP may be used. In particular, a fluorine-containing vinyl monomer represented by the formula (3):

$$CH_2{=}CH{-}Rf^4 \quad (3)$$

(wherein $Rf^4$ represents a C4-C8 perfluoroalkyl group) is one preferred embodiment. The non-fluorinated monomer may be a vinyl monomer represented by the formula (4):

$$CH_2{=}CH{-}R^4 \quad (4)$$

(wherein the number of carbon atoms in $R^4$ is not particularly limited, $R^4$ may contain an aromatic ring, and may contain a carbonyl group, an ester group, an ether group, an amide group, a cyano group, a hydroxyl group, or an epoxy group, and is free from a fluorine atom).

It is also one preferred embodiment that ETFE is also a Et/TFE/HFP copolymer [EFEP], and may further contain a polymerized unit derived from another fluoromonomer (excluding HFP) or another non-fluorinated monomer. Such another fluoromonomer or another non-fluorinated monomer is preferably 10 mol % or less, more preferably 5 mol % or less of the entire polymer. The molar ratio of Et unit:TFE unit:monomer unit derived from the at least one monomer selected from the group consisting of other fluoromonomers and other non-fluorinated monomers is preferably (31.5 to 54.7):(40.5 to 64.7):(0.5 to 10).

The VT preferably includes 35 to 95 mol % of a VdF unit.

The CTFE copolymer is preferably a copolymer composed of a CTFE unit, a TFE unit, and a monomer [A] unit derived from a monomer [A] copolymerizable with CTFE and TFE. The total amount of the CTFE unit and the TFE unit is preferably 90 to 99.9 mol %. The amount of the monomer [A] unit is preferably 0.1 to 10 mol %.

The monomer [A] may be any monomer copolymerizable with CTFE and TFE. Examples thereof include ethylene (Et), vinylidene fluoride (VdF), PAVE represented by $CF_2{=}CF{-}ORf^1$ (wherein $Rf^1$ is a C1-C8 perfluoroalkyl group), vinyl monomers represented by $CX^3X^4{=}CX^5(CF_2)_nX^6$ (wherein $X^3$, $X^4$, and $X^5$ may be the same as or different from each other, and are each a hydrogen atom or a fluorine atom; $X^6$ is a hydrogen atom, a fluorine atom, or a chlorine atom; n is an integer of 1 to 10), and alkyl perfluorovinyl ether derivatives represented by $CF_2{=}CF{-}O{-}Rf^2$ (wherein $Rf^2$ is a C1-C5 perfluoroalkyl group).

The alkyl perfluorovinyl ether derivatives are preferably those in which $Rf^2$ is a C1-C3 perfluoroalkyl group, more preferably $CF_2{=}CF{-}OCF_2{-}CF_2CF_3$.

The monomer [A] is preferably at least one selected from the group consisting of PAVE, the vinyl monomers, and alkyl perfluorovinyl ether derivatives, more preferably at least one selected from the group consisting of PAVE and HFP, particularly preferably PAVE.

In cases where the monomer [A] is PAVE, the amount of the monomer [A] unit is preferably 0.5 to 5 mol %, more preferably 0.5 to 3 mol %.

The amount of the CTFE unit is preferably 10 to 90 mol %, more preferably 15 to 80 mol %, still more preferably to 70 mol % relative to the total amount of the CTFE unit and the TFE unit.

The perfluoro(alkyl vinyl ether) of the PFA is preferably one containing a C1-C6 alkyl group, more preferably perfluoro(methyl vinyl ether), perfluoro(ethyl vinyl ether), or perfluoro(propyl vinyl ether). The PFA contains a perfluoro (alkyl vinyl ether) unit in an amount of preferably more than 0.5 mol % and not more than 8.0 mol %, more preferably 0.7 to 5.0 mol %.

The VT, CTFE copolymer, or PFA may be polymerized with other monomers as long as they have the above compositions. As other monomers, for example, HFP or (perfluorohexyl)ethylene may be used in the case of the VT, Et or VdF may be used in the case of the CTFE copolymer, HFP may be used in the case of the PFA. Each of other monomers may be used alone, or two or more of these may be used.

The amount of the other monomers to be polymerized with the VT, CTFE copolymer, or PFA depends on the types thereof, and is usually preferably not more than 2 mol %, more preferably not more than 1.5 mol % of the resulting fluoropolymer.

The amounts of the monomer units of the above copolymers can be calculated by appropriately combining any of NMR, FT-IR, elementary analysis, and X-ray fluorescence analysis in accordance with the types of monomers.

The wet fluoropolymer is produced by suspension polymerization, solution polymerization, or bulk polymerization of the fluoromonomer in the presence of at least the hydrofluorocarbon in the present invention. Such a polymerization reaction allows to synthesize a wet fluoropolymer wet with a solvent such as a solvent containing at least the hydrofluorocarbon in the present invention. That is, the wet fluoropolymer including a fluoropolymer and a solvent is produced in a reaction vessel by such a polymerization reaction.

After the production step, the wet fluoropolymer contained in the reaction vessel may be directly subjected to the below described vaporizing and discharging step. Alternatively, after the production step, the wet fluoropolymer is transferred from the reaction vessel to a different container, and then may be subjected to the vaporizing and discharging step. Such an embodiment is also within the scope of the present invention. For example, it is also one preferred embodiment that the vaporizing and discharging step is performed after the contents in a reaction vessel are transferred to a different closed container, such as so called a decanter.

The different container is not limited to a specific closed container. Specifically, a container or a container provided in equipment available for the vaporizing and discharging step can be used in the present invention.

Further, after the production step, the solvent of the wet fluoropolymer contained in the reaction vessel or the different container may be partly or entirely replaced with other solvents as long as the wet fluoropolymer contains the hydrofluorocarbon in the present invention.

The different container may be any container available for vaporizing the hydrofluorocarbon, and may be a container provided in equipment such as a dryer (e.g. centrifugal thin-film dryer, conical ribbon dryer, container-rotating dryer, Nauta Mixer, PV mixer, spray dryer). The different container is made of glass, stainless steel, or another corrosion-resistant material, and may include a stirrer, a jacket for temperature control, a thermometer, or a cyclone, if necessary.

The polymerization reaction may be performed as follows: a reaction vessel is charged with the hydrofluorocarbon, a fluoromonomer, and if necessary, additives, the contents in the reaction vessel are stirred, the reaction vessel is maintained at a predetermined polymerization temperature, and a predetermined amount of a polymerization initiator is added to initiate the polymerization reaction. A polymerization solvent other than the hydrofluorocarbon, a surfactant, a chain transfer agent, or a radical capture agent may be added. The polymerization may be carried out by batch type polymerization, semi-batch type polymerization, or in a continuous manner. The raw materials for the polymerization reaction may be added after the start of the polymerization reaction in an intermittent manner or a continuous manner.

The polymerization solvent other than the hydrofluorocarbon may be any solvent, and examples thereof include water; fluorine-free organic solvents such as alcohol, ether, and ketone; and fluorine-containing organic solvents having a boiling point not higher than 100° C. For example, a fluorine-containing organic solvent such as C318 can be used in suspension polymerization.

The polymerization initiator to be used may be a commonly used oil-soluble polymerization initiator and/or water soluble polymerization initiator. Further, the polymerization initiator may be a redox initiator in combination with a reducing agent or the like to initiate the polymerization. The concentration of the polymerization initiator is appropriately determined depending on the type of monomers, the molecular weight of a target fluoropolymer, or the reaction rate.

The hydrofluorocarbon in which the polymerization initiator is dissolved may be added to a reaction vessel.

Examples of the chain transfer agent to be used include hydrocarbons such as isopentane, n-pentane, n-hexane, and cyclohexane; alcohols such as methanol and ethanol; and halogenated hydrocarbons such as carbon tetrachloride, chloroform, methylene chloride, and methyl chloride.

The polymerization temperature of the polymerization reaction is not particularly limited, and is preferably 0° C. to 100° C., more preferably 10° C. to 90° C. The polymerization pressure is not particularly limited, and is preferably 0.1 to 10 MPa, more preferably at 0.3 to 5 MPa.

The polymerization temperature indicates the temperature of the solvent in the reaction vessel, and the polymerization pressure indicates the pressure in the reaction vessel.

The recovering method of the present invention includes vaporizing and discharging vaporizable substances including the hydrofluorocarbon by heating the wet fluoropolymer in a container.

The container may be the reaction vessel that has been used for the polymerization reaction of the fluoromonomer, or a different container such as a container having a vaporizing means or a container provided in equipment. The different container to be used may be, for example, selected from the containers listed above. Specifically, the vaporizable substances may be vaporized in the reaction vessel that has been used for the polymerization reaction of the fluoromonomer, or in a different container after the wet fluoropolymer produced in the reaction vessel is transferred thereto.

The method of vaporizing the vaporizable substances in a different container after the wet fluoropolymer is transferred thereto may be performed as follows: for example, the wet fluoropolymer is transferred to a container having a vaporizing means or a container provided in equipment, and the vaporizable substances are then vaporized from the wet fluoropolymer. Such an embodiment is also one preferred embodiment of the present invention. Alternatively, for example, the wet fluoropolymer is transferred to equipment such as a centrifugal thin film dryer and subjected to solid-liquid separation using centrifugal force to reduce the amount of liquid contained in the wet fluoropolymer, and the vaporizable substances are vaporized from the wet fluoropolymer in a container after the wet fluoropolymer is transferred thereto, or in the container provided in the equipment that has been used for the solid-liquid separation. Such an embodiment is also one preferred embodiment of the present invention.

Such a vaporizing step allows separation of the hydrofluorocarbon from compound species contained in the wet fluoropolymer such as a fluoropolymer and solvents.

The "vaporizable substances" used herein are not limited to a simple substance of a hydrofluorocarbon, and may be a mixture containing substances that are present in the container for the vaporizing step and capable of vaporizing under the conditions where the hydrofluorocarbon can vaporize, such as gases, liquefied gases, and solvents. The vaporizable substances vaporized in the vaporizing step may be partly liquefied during their transfer to a cooling means in some cases.

The substances capable of vaporizing under the conditions where the hydrofluorocarbon can vaporize are determined depending on the type of the hydrofluorocarbon used in the polymerization reaction and the types of compound species contained in the wet fluoropolymer or in a container for the vaporizing step. Specifically, the substances are compounds that have been used in the polymerization reaction, have a boiling point lower than or similar to that of the hydrofluorocarbon used in the polymerization reaction, and vaporize under the heating conditions for heating the wet fluoropolymer in a container to vaporize the hydrofluorocarbon. Specific examples of such substances include unreacted fluoromonomers, non-fluorinated monomers, the above described polymerization solvents, initiator solvents, chain transfer agents, stabilizers, and water vapor.

In particular, in the system for synthesizing PFA using TFE and a perfluoro(alkyl vinyl ether) as monomers, specific examples of the substances capable of vaporizing include TFE, perfluoro(alkyl vinyl ethers), polymerization solvents, initiator solvents, chain transfer agents, other copolymerizable fluoromonomers, other copolymerizable non-fluorinated monomers, stabilizers, and water vapor.

In the system for synthesizing ETFE using TFE, ethylene, and (perfluorobutyl)ethylene as monomers, specific examples of the substances capable of vaporizing include TFE, ethylene, HFP, polymerization solvents, initiator solvents, chain transfer agents, other copolymerizable fluoromonomers, other copolymerizable non-fluorinated monomers, stabilizers, and water vapor.

Heating in the vaporizing step can be performed by heating a container using a heating means. The heating means may be any means, and may be a hot water bath, an oil bath, or steam heating.

The heating temperature in the vaporizing step may be appropriately set, depending on the type of the synthesized fluoropolymer and the type of the hydrofluorocarbon, at a temperature at which the hydrofluorocarbon vaporizes, but the fluoropolymer does not decompose or vaporize. For example, the container may be heated such that the temperature in the container falls within the range of 0° C. to 200° C. If the heating temperature is higher than 200° C., adverse effects such as staining of the fluoropolymer may be caused.

The heating temperature is preferably set so that the temperature in the container falls within the range of 000° C. to 100° C. When the temperature in the container in the vaporizing step is set at 0° C. to 100° C., a hot water bath can be used as a heating means, which is less costly and easily used as a heating means.

The temperature in the container is more preferably lower than 100° C., still more preferably not higher than 90° C., particularly preferably not higher than 80° C. The temperature in the container is more preferably not lower than 10° C., still more preferably not lower than 20° C., particularly preferably not lower than 40° C.

The temperature in the container preferably falls within the above temperature range and is higher than the boiling point of the hydrofluorocarbon.

The vaporizing step may be performed in any manner. For example, the vaporizable substances may be vaporized by reducing the pressure in the container containing the wet fluoropolymer to not higher than atmospheric pressure. The vaporization of the vaporizable substances by reducing the pressure in the container to not higher than atmospheric pressure enables further shortening of the recovery time and further lowering of the heating temperature. Therefore, the hydrofluorocarbon can be more easily separated from the fluoropolymer, water, and the like.

The vaporizing step may be performed while the wet fluoropolymer in the container is stirred. The vaporization of the vaporizable substances while stirring of the wet fluoropolymer in the container enables easier separation of the hydrofluorocarbon from the fluoropolymer, water, and the like.

The stirring rate of the wet fluoropolymer may be appropriately set in light of the size of the container, the concentration of the wet fluoropolymer, the vaporization rate of the vaporizable substances including a target hydrofluorocarbon, and the like. For example, the stirring rate is preferably 10 to 600 rpm, more preferably 30 to 300 rpm, still more preferably 50 to 250 rpm.

In the vaporizing step, a fluorine-containing compound having a lower boiling point than the hydrofluorocarbon may be added to the wet fluoropolymer. In particular, in cases where the weight of the hydrofluorocarbon contained in the container for the vaporizing step is insufficient relative to the weight of the fluoropolymer, a fluorine-containing compound having a lower boiling point than the hydrofluorocarbon is preferably added to the wet fluoropolymer. Such a vaporizing step including adding a fluorine-containing compound having a lower boiling point than the hydrofluorocarbon to the wet fluoropolymer allows easy separation of the hydrofluorocarbon from the fluoropolymer, and promotion of vaporization of the hydrofluorocarbon. As a result, the amount of the hydrofluorocarbon left in the wet fluoropolymer can be reduced to further increase the recovery efficiency of the hydrofluorocarbon. In view of this, the fluorine-containing compound, which is to be added to the wet fluoropolymer, having a lower boiling point than the hydrofluorocarbon herein is also referred to as a "vaporization promoting substance".

The fluorine-containing compound has a boiling point of preferably not lower than −50° C. but lower than 10° C., more preferably not higher than 0° C., still more preferably lower than 0° C.

The vaporization promoting substance is preferably one highly compatible with the fluoropolymer, and is therefore appropriately selected depending on the type of the fluoropolymer to be produced. Preferred examples thereof include hexafluoropropylene (HFP) and perfluorocyclobutane (C318).

Each of these vaporization promoting substances may be used alone, or two or more of these may be used in combination.

Examples of the embodiments of adding the vaporization promoting substance to the wet fluoropolymer include an embodiment in which PFA is synthesized as a fluoropolymer and C318 is added as a vaporization promoting substance, and an embodiment in which ETFE is synthesized as a fluoropolymer and C318 is added as a vaporization promoting substance.

The amount of the vaporization promoting substance to be added is not particularly limited, and is preferably 1% to 10000% by mass relative to 100% by mass of the hydrofluorocarbon when the amount of the hydrofluorocarbon contained in the wet fluoropolymer at the time of addition of the vaporization promoting substance is 100% by mass. Addition of the above-described amount of the vaporization promoting substance can sufficiently enhance the effects of adding the vaporization promoting substance, thereby increasing the recovery efficiency of the hydrofluorocarbon.

The recovering method of the present invention includes transferring the vaporizable substances vaporized in the vaporizing and discharging step to a cooling means to cool the substances. The vaporizable substances in the vaporized state transferred to a cooling means are cooled to be liquefied to give vaporizable substances in the liquid state including the hydrofluorocarbon.

The cooling temperature in the cooling step may be appropriately set to a temperature at which the hydrofluorocarbon contained in the vaporizable substances in the vaporized state is liquefied. For example, cooling is performed such that the temperature in the cooling means is set within the range of preferably −30° C. to 20° C., more preferably 0° C. to 20° C.

The cooling temperature is preferably lower than the boiling point of the hydrofluorocarbon. The cooling temperature is more preferably lower than the boiling point of the hydrofluorocarbon and falls within the above cooling temperature range.

The cooling means in the cooling step may be any means, and is preferably a condenser. Thus, it is one preferred embodiment of the present invention that the cooling means in the cooling step is a condenser.

The recovering method of the present invention preferably includes transferring the vaporizable substances liquefied by cooling in the cooling step to a distillation means to distill the vaporizable substances.

The distillation of the vaporizable substances liquefied in the cooling step enables separation of the hydrofluorocarbon contained in the vaporizable substances from other compounds. Thus, the hydrofluorocarbon can be separated and recovered.

The distillation means in the distillation step may be any means, and may be, for example, distillation equipment or multistage distillation equipment (rectification equipment).

The recovering method of the present invention is not limited and may further include transferring the vaporizable substances vaporized in the vaporizing step to a compression means to compress the vaporizable substances. The compression of the vaporizable substances in the vaporized state enables an increase in the gas concentration, which leads to a further increase in the recovery efficiency of the hydrofluorocarbon. In cases where the recovering method of the present invention includes the compression step as described above, it is preferred that the vaporizable substances vaporized in the vaporizing step is at first transferred to the compression means and compressed, and then the vaporizable substances compressed in the compression step are transferred to the cooling means and cooled. That is, the compression step is preferably performed between the vaporizing and discharging step, and the cooling step.

The upper limit of the compression ratio in the compression step is not particularly limited, and is for example, preferably 2 to 40. Such a compression ratio falling within the above range is enough to sufficiently compress the vaporizable substances in the vaporized state, and contributes to a further increase in the recovery efficiency of the hydrofluorocarbon.

The compression means in the compression step may be any means, and may be, for example, a centrifugal compressor, an axial flow compressor, or a displacement compressor. Among these, a displacement compressor is particularly preferred. That is, it is one preferred embodiment of the present invention that the compression means in the compression step is a compressor.

In cases where the compression means is a compressor, the vaporizable substances in the vaporized state transferred to the compressor are preferably heated again before being compressed because if the vaporizable substances in the vaporized state transferred to a compressor are liquefied before being compressed by the compressor, the vaporizable substances in the liquid state may cause a failure of the compressor.

In the recovering method of the present invention, the vaporizable substances liquefied by cooling in the cooling step, or the hydrofluorocarbon separated in the distillation step in the case of performing the distillation step is transferred to and recovered in a recovery container. It is also one preferred embodiment of the present invention that the recovering method includes transferring the vaporizable substances liquefied by cooling in the cooling step, or in the case of performing the distillation step, the hydrofluorocarbon separated in the distillation step to a recovery container to recover them.

In the present invention, for example, the recovery container to recover the vaporizable substances in the liquid state may include a cooling means, and the cooling step and the recovery step of the vaporizable substances may be performed at the same time. That is, it is also one preferred embodiment of the present invention that the cooling step and the recovery step of the vaporizable substances include transferring the vaporizable substances vaporized in the vaporizing step to a recovery container including a cooling means, and recovering the vaporizable substances liquefied by cooling in the recovery container.

Furthermore, the vaporizable substances in the liquid state recovered in the recovery container may be transferred to the distillation means, and distilled. Thereby, the hydrofluorocarbon can be separated and recovered.

The hydrofluorocarbon separated from the wet fluoropolymer and recovered can be reused.

In the recovering method of the present invention, x/V is preferably at most 0.140, wherein V represents the inner volume (L) of the container, and x represents the discharge rate (kg/hour) of the vaporizable substances discharged from the container.

When the vaporizable substances in the vaporized state are transferred from the container for the vaporizing step to the cooling means at such a rate, the vaporizable substances containing the hydrofluorocarbon can be transferred from the container for the vaporizing step to the cooling means without bringing the fluoropolymer together therewith, and the fluoropolymer is prevented from being mixed into the vaporizable substances. In this manner, a decrease in the yield of the fluoropolymer can be prevented. Mixing of the fluoropolymer into the vaporizable substances is remarkably disadvantageous in separation of the hydrofluorocarbon from the vaporizable substances and purification of the hydrofluorocarbon, or reuse of the hydrofluorocarbon. If the vaporizable substances are transferred too rapidly, the fluoropolymer may be transferred along with the vaporizable substances to be mixed into the vaporizable substances when the vaporizable substances are transferred from the container for the vaporizing step to the cooling means. On the other hand, if the vaporizable substances are transferred too slowly, the resulting fluoropolymer may be stained. The x/V is preferably not less than 0.0012.

For the transfer rate of the vaporizable substances, the x/V is more preferably not less than 0.0060, still more preferably not more than 0.090, further preferably not more than 0.050.

The discharge rate (x) of the vaporizable substances discharged from the container for the vaporizing step is not particularly limited, and can be controlled by, for example, adjusting the opening degree of a valve during their transfer, arranging an orifice in a pipe, or reducing the size of a pipe. For example, it is one preferred method that a needle valve is automatically controlled in accordance with the discharge rate of the vaporizable substances in the vaporized state.

The method for recovering of the present invention can provide a fluoropolymer obtained by drying a fluoropolymer left in the container after the vaporizing step (hereinafter also referred to simply as "dried fluoropolymer") in an amount of 0.01 to 0.4 kg per liter of the volume of the container. The amount of the dry fluoropolymer obtained is not particularly limited.

In the recovering method of the present invention, a commonly used pipe can be used to transfer the vaporizable substances in the vaporized state, the vaporizable substances in the liquefied state, or the hydrofluorocarbon separated. The vaporizable substances in the vaporized state are sometimes partly liquefied in the pipe during their transfer to a cooling means.

In the recovering method of the present invention, the vaporizable substances are vaporized from the wet fluoropolymer, cooled, and liquefied, and then the vaporizable substances in the liquid state are recovered, and if necessary, the vaporizable substances in the liquid state are purified by distillation to give a hydrofluorocarbon and the resulting hydrofluorocarbon is reused. As the recovery step of the vaporizable substances progresses, the pressure in the container reduces. The recovery step may preferably be stopped at the time when the pressure in the container is reduced to the range of −0.001 to −0.09 MPa, but in the present invention, the pressure in the container at which the recovery step is stopped is not limited to atmospheric pressure or lower.

The fluoropolymer synthesized in the production step can be collected after it is separated from the vaporizable substances including the hydrofluorocarbon by vaporizing and discharging the vaporizable substances by heating the wet fluoropolymer in the container in the recovering method of the present invention. In cases where the fluoropolymer is obtained in the form of slurry through a polymerization reaction, a slurry may be withdrawn from a reaction vessel, washed, and dried to collect a dry fluoropolymer. The drying provides the fluoropolymer in the form of powder.

One example of the preferred embodiments of the recovering method of the present invention is a method including: producing a wet fluoropolymer by suspension polymerization, solution polymerization, or bulk polymerization in the presence of at least a hydrofluorocarbon; vaporizing and discharging vaporizable substances including the hydrofluorocarbon by heating the wet fluoropolymer in a container; transferring the vaporizable substances in the vaporized state to a recovery container equipped with a cooling means; recovering the vaporizable substances liquefied by cooling in the recovery container; subsequently adding the vaporization promoting substance to the wet fluoropolymer in the container; performing the steps of vaporizing through recovering; and further repeating the steps of adding the vaporization promoting substance through recovering once or more; after completion of the final recovery step, returning the pressure in the container to atmospheric pressure; and washing and drying the wet fluoropolymer remained in the container to give a dry fluoropolymer. The recovering method may further include: transferring the vaporizable substances in the liquefied state recovered in the recovery container to a distillation means to distill the vaporizable substances to separate and recover the hydrofluorocarbon. In such an embodiment, the steps of adding the vaporization promoting substance through recovering the vaporizable substances are repeated preferably three or more times, more preferably five or more times, still more preferably seven or more times.

An example of the overall process of the recovering method of the present invention is described using a flow diagram in FIG. 1.

First, raw materials for a polymerization reaction including a hydrofluorocarbon are placed in a reaction vessel 11, and polymerization of the materials is performed to synthesize a wet fluoropolymer (production step of wet fluoropolymer). Vaporizable substances including the hydrofluorocarbon are vaporized and discharged by heating the synthesized wet fluoropolymer with a heating means 21 (vaporizing and discharging step). Then, the vaporizable substances in the vaporized state are transferred to a cooling means 23 such as a condenser, and cooled (cooling step). The vaporizable substances liquefied by cooling are transferred to a recovery container 12 and recovered (recovery step). Gas other than the vaporizable substances is discharged from a discharge means 24. The transfer rate of the vaporizable substances including the hydrofluorocarbon transferred from the reaction vessel 11 to the cooling means 23 is adjusted, for example, by adjusting the opening degree of a valve 22 to control the discharge rate of the vaporizable substances.

In the present invention, step(s) other than these steps may be included, and each step may be repeated twice or more, as long as the effects of the present invention are achieved. In cases where each step is repeated twice or more, at least one of the repeated steps needs to satisfy the present invention. Further, in cases where a series of steps from the vaporizing and discharging step to the recovery step is repeated several times, at least one series of the steps preferably satisfies x/V of at most 0.140 V, wherein V represents the inner volume (L) of the container, and x represents the discharge rate (kg/hour) of the vaporizable substances discharged from the container. The x/V is more preferably 0.090 or less, still more preferably 0.050 or less. The x/V is more preferably 0.0012 or more, still more preferably 0.0060 or more.

The hydrofluorocarbon recovered by the method for recovering a hydrofluorocarbon of the present invention can be reused, for example, for production of wet fluoropolymers.

The reuse of the hydrofluorocarbon enables a reduction in cost of production and purchase of hydrofluorocarbon. Further, the reuse of the hydrofluorocarbon also enables a reduction in the amount of the hydrofluorocarbon emitted, which contributes to a reduction in environmental impact. Thus, the use of a hydrofluorocarbon including reusing the hydrofluorocarbon recovered by the method for recovering a hydrofluorocarbon of the present invention is also one preferred embodiment of the present invention.

EXAMPLES

The present invention is specifically described by means of examples, but is not limited thereto.

The values in the examples were measured by the following methods.

[Melting Point]

Using a differential scanning calorimeter (DSC), 3 mg of a sample was heated from room temperature to 300° C. at 10° C./min, cooled down to room temperature at −10° C./min, and heated again from room temperature at 10° C./min. The melting peak temperature in this case was determined as the melting point.

[MFR]

Using a melt indexer, the mass (g/10 minutes) of the polymer flowing out through a nozzle with a 2-mm inner diameter and an 8-mm length during a 10-minute period of time (g/10 minutes) under a load of 5 kg was determined as a MFR, in accordance with ASTM D3307-01.

Comparative Example 1

(Polymerization Reaction)

A 175-L autoclave was charged with 55 L of distilled water, and sufficiently purged with nitrogen. Subsequently, 38 kg of perfluorocyclobutane (C318) was added to the autoclave. The temperature in the system was maintained at 35° C., and the stirring rate was maintained at 235 rpm.

Then, 64 g of cyclohexane, 165 g of (perfluorobutyl) ethylene, 240 g of ethylene, and 11 kg of TFE were added. Thereafter, 300 g of a 50% by weight solution of di-n-propyl peroxydicarbonate (NPP)/methanol was added as a polymerization initiator to initiate the reaction.

Since the pressure in the system drops with the progress of the polymerization, a mixture of TFE/ethylene/C318 (TFE/ethylene/C318 (molar ratio)=50/45/5) was continually added to maintain the pressure in the system at 1.25 MPa. The mixture of TFE/ethylene/C318 in a total amount of 50 kg was added, the contents were continually stirred for 24 hours, and the reaction was stopped.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

80% of C318 was recovered as a mixture with TFE and ethylene in the recovery tank. The amount of fluororesin powder mixed into the recovered liquid along with the gas components was less than 0.001 kg. The fluororesin had a melting point of 245° C., and a MFR of 7.3 g/10 min. The compression ratio of the compressor was 7.5.

Example 1

(Polymerization Reaction)

In the polymerization reaction, the same procedure was performed as in Comparative Example 1, except that $CF_3CH_2CF_2H$ (HFC-245fa, boiling point: 15.3° C.) was used instead of C318.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 99% of $CF_3CH_2CF_2H$ added for the polymerization was recovered as a mixture of $CF_3CH_2CF_2H$, C318, TFE, and ethylene in the recovery tank. The amount of fluororesin powder mixed into the recovered liquid along with the gas components was less than 0.001 kg. The amount of fluororesin powder obtained was 39 kg. The resulting fluororesin had a melting point of 245° C., and a MFR of 7.5 g/10 min. The compression ratio of the compressor was 7.5. $CF_3CH_2CF_2H$, C318, TFE, and ethylene recovered in the recovery tank were transferred to a rectifier (multistage distillation column) made of stainless steel, and were separated from one another by rectification (multistage distillation). $CF_3CH_2CF_2H$ separated from ethylene, TFE, and C318 was subjected to distillation using a simple distillation apparatus.

(Polymerization of Recovered Product and Solvent Recovery)

In the polymerization reaction, the same procedure was performed as in Comparative Example 1, except that $CF_3CH_2CF_2H$ (HFC-245fa) recovered in the solvent recovery step was used instead of C318.

The same procedure was performed as in the solvent recovery step, and 99% of $CF_3CH_2CF_2H$ added for the polymerization was recovered as a mixture of $CF_3CH_2CF_2H$, TFE, and ethylene in the recovery tank. The amount of fluororesin powder mixed into the recovered liquid along with the gas components was less than 0.001 kg. The amount of fluororesin powder obtained was 39 kg. The fluororesin had a melting point of 245° C., and a MFR of 7.3 g/10 min.

Example 2

(Polymerization Reaction)

The same procedure was performed as in Example 1.

(Solvent Recovery Step)

The same procedure was performed as in Example 1, except that the recovery using C318 was not performed in the solvent recovery step.

Then, 90% of $CF_3CH_2CF_2H$ was recovered as a mixture with TFE and ethylene in the recovery tank. The amount of fluororesin powder mixed into the recovered liquid along with the gas components was less than 0.001 kg.

Example 3

(Polymerization Reaction)

The same procedure was performed as in Example 1.

(Solvent Recovery Step)

The same procedure was performed as in Example 2, except that the gas components were transferred to the recovery tank from the gas phase portion in the autoclave at a rate of about 15.5 kg/hour over 2.6 hours by adjusting the opening degree of a valve in this step.

Then, 90% of $CF_3CH_2CF_2H$ was recovered as a mixture with TFE and ethylene in the recovery tank. The fluororesin transferred along with the gas components was present in the recovered liquid in an amount equivalent to 0.01 kg of fluororesin powder.

Example 4

(Polymerization Reaction)

The same procedure was performed as in Example 1.

(Solvent Recovery Step)

The same procedure was performed as in Example 2, except that the gas components were transferred to the recovery tank from the gas phase portion in the autoclave at a rate of about 22 kg/hour over 1.8 hours by adjusting the opening degree of a valve in this step.

Then, 90% of $CF_3CH_2CF_2H$ was recovered as a mixture with TFE and ethylene in the recovery tank. The fluororesin transferred along with the gas components was present in the recovered liquid in an amount equivalent to 0.03 kg of fluororesin powder.

Example 5

(Polymerization Reaction)

The same procedure was performed as in Example 1.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 25 kg/hour by adjusting the opening degree of a valve in this step. The fluororesin was transferred along with the gas components to be mixed in the recovered liquid in an amount equivalent to 5 kg of fluororesin powder. Then, 90% of $CF_3CH_2CF_2H$ was recovered. The compression ratio of the compressor was 7.5.

Example 6

(Polymerization Reaction)

The same procedure was performed as in Example 1.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 1 kg/hour by adjusting the opening degree of a valve in this step. The pressure in the autoclave was reduced to −0.02 MPa over 40 hours.

Next, 500 g of C318 was added to the autoclave inside which the temperature was 80° C., and the contents in the autoclave were mixed for 30 minutes. The pressure in the autoclave was reduced to −0.02 MPa at a rate of about 0.2 kg/hour over 3.5 hours by adjusting the opening degree of a valve in this step.

The steps of addition of C318 through reduction of the pressure to −0.02 MPa in the recovery operation were repeated seven times, and the pressure was then returned to atmospheric pressure. The reaction product was washed with water.

Then, 99% of $CF_3CH_2CF_2H$ added for the polymerization was recovered as a mixture with C318, TFE, and ethylene in the recovery tank. The amount of fluororesin powder mixed into the recovered liquid along with the gas components was less than 0.001 kg.

The pressure in the autoclave was released to atmospheric pressure, and then the contents were dried to give 39 kg of a fluororesin powder. The powder was stained in pale gray. The resulting fluororesin had a melting point of 245° C., and a MFR of 7.0 g/10 min. The compression ratio of the compressor was 7.5.

Example 7

(Polymerization Reaction)

The same procedure was performed as in Example 1.

(Solvent Recovery Step)

The temperature in the autoclave was set at 80° C., and the temperature in a recovery tank was set at −20° C. Gas components were transferred to the recovery tank from the gas phase portion in the autoclave without using a compressor at a rate of about 6.3 kg/hour by adjusting the opening degree of a valve in this step.

Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 90% of $CF_3CH_2CF_2H$ added for the polymerization was recovered as a mixture with C318, TFE, and ethylene in the recovery tank. The amount of fluororesin powder mixed into the recovered liquid along with the gas components was less than 0.001 kg. The amount of fluororesin powder obtained was 39 kg. The fluororesin had a melting point of 245° C., and a MFR of 7.5 g/10 min. $CF_3CH_2CF_2H$, C318, TFE, and ethylene recovered in the recovery tank were transferred to a rectifier (multistage distillation column) made of stainless steel, and they were rectified (subjected to multistage distillation) to separate $CF_3CH_2CF_2H$ from ethylene, TFE, and C318. $CF_3CH_2CF_2H$ separated from ethylene, TFE, and C318 was subjected to distillation using a simple distillation apparatus.

Example 8

(Polymerization Reaction)

In the polymerization reaction, the same procedure was performed as in Comparative Example 1, except that $CF_3CF_2CFHCFHCF_3$ (HFC-43-10mee, boiling point: 55° C.) was used instead of C318.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 99% of $CF_3CF_2CFHCFHCF_3$ added for the polymerization was recovered as a mixture of $CF_3CF_2CFHCFHCF_3$, C318, TFE, and ethylene in the recovery tank. The amount of fluororesin powder mixed into the recovered liquid along with the gas components was less than 0.001 kg. The amount of fluororesin powder obtained was 39 kg. The resulting fluororesin had a melting point of 245° C., and a MFR of 7.5 g/10 min. The compression ratio of the compressor was 7.5.

$CF_3CF_2CFHCFHCF_3$, C318, TFE, and ethylene recovered in the recovery tank were transferred to a rectifier (multistage distillation column) made of stainless steel, and were separated from one another by rectification (multistage distillation). $CF_3CF_2CFHCFHCF_3$ separated from ethylene, TFE, and C318 was subjected to distillation using a simple distillation apparatus.

(Polymerization of Recovered Product and Solvent Recovery)

In the polymerization reaction, the same procedure was performed as in Comparative Example 1, except that $CF_3CF_2CFHCFHCF_3$ (HFC-43-10mee) recovered in the solvent recovery step was used instead of C318.

The same procedure was performed as in the solvent recovery step, and 99% of $CF_3CF_2CFHCFHCF_3$ added for the polymerization was recovered as a mixture of $CF_3CF_2CFHCFHCF_3$, TFE, and ethylene in the recovery tank. The amount of fluororesin powder mixed into the recovered liquid along with the gas components was less than 0.001 kg. The amount of fluororesin powder obtained was 39 kg. The resulting fluororesin had a melting point of 245° C., and a MFR of 7.3 g/10 min.

Example 9

(Polymerization Reaction)

The same procedure was performed as in Example 8.

(Solvent Recovery Step)

The same procedure was performed as in Example 8, except that the recovery using C318 was not performed in the solvent recovery step.

Then, 90% of $CF_3CF_2CFHCFHCF_3$ was recovered as a mixture with TFE and ethylene in the recovery tank. The amount of fluororesin powder mixed into the recovered liquid along with the gas components was less than 0.001 kg.

Example 10

(Polymerization Reaction)

The same procedure was performed as in Example 8.

(Solvent Recovery Step)

The same procedure was performed as in Example 9, except that the gas components were transferred to the recovery tank from the gas phase portion in the autoclave at a rate of about 15.5 kg/hour over 2.6 hours by adjusting the opening degree of a valve in this step.

Then, 90% of $CF_3CF_2CFHCFHCF_3$ was recovered as a mixture with TFE and ethylene in the recovery tank. The fluororesin transferred along with the gas components was present in the recovered liquid in an amount equivalent to 0.01 kg of fluororesin powder.

Example 11

(Polymerization Reaction)

The same procedure was performed as in Example 8.

(Solvent Recovery Step)

The same procedure was performed as in Example 9, except that the gas components were transferred to the recovery tank from the gas phase portion in the autoclave at a rate of about 22 kg/hour over 1.8 hours by adjusting the opening degree of a valve in this step.

Then, 90% of $CF_3CF_2CFHCFHCF_3$ was recovered as a mixture with TFE and ethylene in the recovery tank. The fluororesin transferred along with the gas components was present in the recovered liquid in an amount equivalent to 0.03 kg of fluororesin powder.

Example 12

(Polymerization Reaction)

The same procedure was performed as in Example 8.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 25 kg/hour by adjusting the opening degree of a valve in this step. The fluororesin was transferred along with the gas components to be mixed in the recovered liquid in an amount equivalent to 5 kg of fluororesin powder. Then, 90% of $CF_3CF_2CFHCFHCF_3$ was recovered. The compression ratio of the compressor was 7.5.

Example 13

(Polymerization Reaction)

The same procedure was performed as in Example 8.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 1 kg/hour by adjusting the opening degree of a valve in this step. The pressure in the autoclave was reduced to −0.02 MPa over 40 hours.

Next, 500 g of C318 was added to the autoclave inside which the temperature was 80° C., and the contents in the autoclave were mixed for 30 minutes. The pressure in the autoclave was reduced to −0.02 MPa at a rate of about 0.2 kg/hour over 3.5 hours by adjusting the opening degree of a valve in this step.

The steps of addition of C318 through reduction of the pressure to −0.02 MPa in the recovery operation were repeated seven times, and the pressure was then returned to atmospheric pressure. The reaction product was washed with water.

Then, 99% of $CF_3CF_2CFHCFHCF_3$ added for the polymerization was recovered as a mixture with C318, TFE, and ethylene in the recovery tank. The amount of fluororesin powder mixed into the recovered liquid along with the gas components was less than 0.001 kg.

The pressure in the autoclave was released to atmospheric pressure, and then the contents were dried to give 39 kg of a fluororesin powder. The powder was stained in pale gray. The resulting fluororesin had a melting point of 245° C., and a MFR of 7.0 g/10 min.

The compression ratio of the compressor was 7.5.

Example 14

(Polymerization Reaction)

The same procedure was performed as in Example 8.

(Solvent Recovery Step)

The temperature in the autoclave was set at 80° C., and the temperature in a recovery tank was set at −20° C. Gas components were transferred to the recovery tank from the gas phase portion in the autoclave without using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 90% of $CF_3CF_2CFHCFHCF_3$ added for the polymerization was recovered as a mixture with C318, TFE, and ethylene in the recovery tank. The amount of fluororesin powder mixed into the recovered liquid along with the gas components was less than 0.001 kg. The amount of fluororesin powder obtained was 39 kg. The fluororesin had a melting point of 245° C., and a MFR of 7.5 g/10 min.

$CF_3CF_2CFHCFHCF_3$, C318, TFE, and ethylene recovered in the recovery tank were transferred to a rectifier (multistage distillation column) made of stainless steel, and were separated from one another by rectification (multistage distillation). $CF_3CF_2CFHCFHCF_3$ separated from ethylene, TFE, and C318 was subjected to distillation using a simple distillation apparatus.

Example 15

(Polymerization Reaction)

The same procedure was performed as in Example 1, except that $CF_3CH_2CF_2CH_3$ (HFC-365mfc, boiling point: 40.2° C.) was used instead of $CF_3CH_2CF_2H$ (HFC-245fa).

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 99% of $CF_3CH_2CF_2CH_3$ added for the polymerization was recovered as a mixture of $CF_3CH_2CF_2CH_3$, C318, TFE, and ethylene in the recovery tank. The amount of fluororesin powder mixed into the recovered liquid along with the gas components was less than 0.001 kg. The amount of fluororesin powder obtained was 39 kg. The resulting fluororesin had a melting point of 245° C., and a MFR of 7.4 g/10 min. The compression ratio of the compressor was 7.5.

$CF_3CH_2CF_2CH_3$, C318, TFE, and ethylene recovered in the recovery tank were transferred to a rectifier (multistage distillation column) made of stainless steel, and were separated from one another by rectification (multistage distillation). $CF_3CH_2CF_2CH_3$ separated from ethylene, TFE, and C318 was subjected to distillation using a simple distillation apparatus.

Example 16

(Polymerization Reaction)

A 175-L autoclave was charged with 42 L of distilled water, and sufficiently purged with nitrogen. Subsequently, 33 kg of $CF_3CH_2CF_2H$ (HFC-245fa) was added to the autoclave. The temperature in the system was maintained at 35° C., and the stirring rate was maintained at 235 rpm.

Then, 1.67 kg of perfluoro(propyl vinyl ether) (PPVE) and 292 g of methanol were added, and TFE was added until the pressure reached 0.84 MPa. Thereafter, 73 g of a 50% by weight solution of di-n-propyl peroxydicarbonate (NPP)/methanol was added as a polymerization initiator to initiate the reaction.

Since the pressure in the system drops with the progress of the polymerization, TFE was continually added to maintain the pressure in the system at 0.84 MPa. TFE in a total amount of 35 kg was added, and the reaction was stopped.

(Solvent Recovery Step)

The temperature in the autoclave was set at 80° C., and the temperature in a recovery tank was set at 10° C. Gas components were transferred to the recovery tank from the gas phase portion in the autoclave using a compressor at a rate of about 6.3 kg/hour by adjusting the opening degree of a valve in this step. Gas components not liquefied in the cooling step were discharged from the recovery tank through a duct of the recovery tank to a gas holder to regulate the inner pressure of the recovery tank to the range of 0.6 to 0.8 MPa. The pressure in the autoclave was reduced to −0.02 MPa over 8 hours.

Next, 500 g of C318 was added to the autoclave inside which the temperature was 80° C., and the contents in the autoclave were mixed for 30 minutes. The pressure in the autoclave was reduced to −0.02 MPa at a rate of about 1.1 kg/hour over 30 minutes by adjusting the opening degree of a valve in this step. The steps of addition of C318 through reduction of the pressure to −0.02 MPa in the recovery operation were repeated seven times, and the pressure was then returned to atmospheric pressure. The reaction product was washed with water.

Then, 99% of $CF_3CH_2CF_2H$ added for the polymerization was recovered as a mixture with C318 and TFE in the recovery tank. The amount of fluororesin powder mixed into the recovered liquid along with the gas components was less than 0.001 kg.

The amount of fluororesin powder obtained was 36 kg. The resulting fluororesin had a melting point of 304° C., and a MFR of 2.0 g/10 min. The compression ratio of the compressor was 7.5.

$CF_3CH_2CF_2H$, C318, and TFE recovered in the recovery tank were transferred to a rectifier (multistage distillation column) made of stainless steel, and were separated from one another by rectification (multistage distillation). $CF_3CH_2CF_2H$ separated from C318 and TFE was further subjected to distillation using a simple distillation apparatus.

Table 1 shows the recovering conditions and the recovery efficiency of Examples 1 to 16 and Comparative Example 1.

TABLE 1

| | | Comparative Example 1 | Example 1 | Example 2 | Example 3 | Example 4 | Example 5 | Example 6 | Example 7 |
|---|---|---|---|---|---|---|---|---|---|
| Fluororesin | | ETFE | ETFE | ETFE | ETFE | ETFE | ETFE | ETFE | ETFE |
| Solvent | | C318 | HFC-245fa | HFC-245fa | HFC-245fa | HFC-245fa | HFC-245fa | HFC-245fa | HFC-245fa |
| Recovery efficiency | [%] | 80 | 99 | 90 | 90 | 90 | 90 | 99 | 90 |
| Transfer rate | [(kg/hr)/L] | 0.0360 | 0.0360 | 0.0360 | 0.0886 | 0.1257 | 0.1429 | 0.0057 | 0.0360 |
| (x/V) | | — | 0.0063 | — | — | — | — | 0.0011 | 0.0063 |
| Vaporization promoting substance | | Absent | C318 | Absent | Absent | Absent | Absent | C318 | C318 |

TABLE 1-continued

| | | | | | | | | | |
|---|---|---|---|---|---|---|---|---|---|
| Compression ratio | | 7.5 | 7.5 | 7.5 | 7.5 | 7.5 | 7.5 | 7.5 | Absent |
| Cooling temperature | [° C.] | 10 | 10 | 10 | 10 | 10 | 10 | 10 | −20 |
| Amount of fluororesin in recovered liquid | [kg] | <0.001 | <0.001 | <0.001 | 0.01 | 0.03 | 5 | <0.001 | <0.001 |

| | | Example 8 | Example 9 | Example 10 | Example 11 | Example 12 | Example 13 | Example 14 | Example 15 | Example 16 |
|---|---|---|---|---|---|---|---|---|---|---|
| Fluororesin | | ETFE | ETFE | ETFE | ETFE | ETFE | ETFE | ETFE | ETFE | PFA |
| Solvent | | HFC-43-10mee | HFC-43-10mee | HFC-43-10mee | HFC-43-10mee | HFC-43-10mee | HFC-43-10mee | HFC-43-10mee | HFC-365mfc | HFC-245fa |
| Recovery efficiency | [%] | 99 | 90 | 90 | 90 | 90 | 99 | 90 | 99 | 99 |
| Transfer rate | [(kg/hr)/L] | 0.0360 | 0.0360 | 0.0886 | 0.1257 | 0.1429 | 0.0057 | 0.0360 | 0.0360 | 0.0360 |
| (x/V) | | 0.0063 | — | — | — | — | 0.0011 | 0.0063 | 0.0063 | 0.0063 |
| Vaporization promoting substance | | C318 | Absent | Absent | Absent | Absent | C318 | C318 | C318 | C318 |
| Compression ratio | | 7.5 | 7.5 | 7.5 | 7.5 | 7.5 | 7.5 | Absent | 7.5 | 7.5 |
| Cooling temperature | [° C.] | 10 | 10 | 10 | 10 | 10 | 10 | −20 | 10 | 10 |
| Amount of fluororesin in recovered liquid | [kg] | <0.001 | <0.001 | 0.01 | 0.03 | 5 | <0.001 | <0.001 | <0.001 | <0.001 |

REFERENCE SIGNS LIST

11: Reaction vessel
12: Recovery container
21: Heating means
22: Valve
23: Cooling means
24: Discharge means

The invention claimed is:

1. A method for recovering a hydrofluorocarbon, comprising:

producing a wet fluoropolymer by suspension polymerization, solution polymerization, or bulk polymerization in the presence of a hydrofluorocarbon;

vaporizing and discharging vaporizable substances including the hydrofluorocarbon by heating the wet fluoropolymer in a container; and transferring the discharged vaporizable substances to a cooling means to cool the substances, and wherein x/V is at most 0.140, wherein V represents an inner volume (L) of the container, and x represents a discharge rate (kg/hour) of the vaporizable substances discharged from the container.

2. The method for recovering a hydrofluorocarbon according to claim 1, wherein the hydrofluorocarbon has a boiling point of −10° C. to 100° C.

3. The method for recovering a hydrofluorocarbon according to claim 1, wherein the hydrofluorocarbon has a boiling point of 0° C. to 85° C.

4. The method for recovering a hydrofluorocarbon according to claim 1, wherein in the vaporizing step, the temperature in the container is 0° C. to 100° C.

5. The method for recovering a hydrofluorocarbon according to claim 1, wherein the fluoropolymer has a polymerized unit derived from at least one fluoromonomer selected from the group consisting of tetrafluoroethylene, hexafluoropropylene, vinylidene fluoride, chlorotrifluoroethylene, (perfluoromethyl)vinyl ether, (perfluoroethyl)vinyl ether, (perfluoropropyl)vinyl ether, trifluoroethylene, vinyl fluoride, perfluoro(alkyl vinyl ethers) represented by the formula (2-1):

$$CF_2{=}CFO(CF_2CF(Y)O)_m(CF_2)_nF \quad (2\text{-}1)$$

wherein Y represents a fluorine atom or a trifluoromethyl group, m is an integer of 0 to 2, and n is an integer of 1 to 4, monomers represented by the formula (2-2):

$$CH_2{=}CF(CF_2)_nZ \quad (2\text{-}2)$$

wherein Z represents a fluorine atom or a hydrogen atom, and n is an integer of 1 to 8, and monomers represented by the formula (2-3):

$$CH_2{=}CH(CF_2)_nZ \quad (2\text{-}3)$$

wherein Z represents a fluorine atom or a hydrogen atom, and n is an integer of 1 to 8.

6. The method for recovering a hydrofluorocarbon according to claim 1, wherein the fluoropolymer has a polymerized unit derived from tetrafluoroethylene and a polymerized unit derived from ethylene.

7. The method for recovering a hydrofluorocarbon according to claim 1, further comprising transferring the vaporizable substances liquefied by cooling in the cooling step to a distillation means to distill the substances.

8. The method for recovering a hydrofluorocarbon according to claim 1, wherein a fluorine-containing compound having a lower boiling point than the hydrofluorocarbon is added to the wet fluoropolymer.

9. The method for recovering a hydrofluorocarbon according to claim 1, further comprising transferring the vaporizable substances vaporized in the vaporizing step to a compression means to compress the substances.

10. The method for recovering a hydrofluorocarbon according to claim 9, wherein the compression means is a compressor.

11. The method for recovering a hydrofluorocarbon according to claim 1, wherein the cooling means is a condenser.

12. A method for using a hydrofluorocarbon comprising: reusing a hydrofluorocarbon recovered by the method for recovering a hydrofluorocarbon according to claim 1.

* * * * *